(12) United States Patent
Kwak

(10) Patent No.: US 10,958,853 B2
(45) Date of Patent: Mar. 23, 2021

(54) APPARATUS TO PROVIDE A SCREEN CAPTURING FUNCTION AND A METHOD OF PROVIDING THE SCREEN CAPTURING FUNCTION

(71) Applicant: Samsung Electronics Co., Ltd., Suwon-si (KR)

(72) Inventor: Ji-yeon Kwak, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/379,259

(22) Filed: Apr. 9, 2019

(65) Prior Publication Data

US 2019/0238760 A1 Aug. 1, 2019

Related U.S. Application Data

(63) Continuation of application No. 14/674,551, filed on Mar. 31, 2015, now abandoned, which is a (Continued)

(30) Foreign Application Priority Data

Oct. 24, 2005 (KR) .................. 10-2005-0100432

(51) Int. Cl.
*H04N 5/262* (2006.01)
*H04N 21/414* (2011.01)
(Continued)

(52) U.S. Cl.
CPC ....... *H04N 5/2628* (2013.01); *H04N 5/23216* (2013.01); *H04N 5/23293* (2013.01);
(Continued)

(58) Field of Classification Search
CPC .............. H04N 5/2628; H04N 5/2627; H04N 5/23216; H04N 21/47; H04N 21/8455;
(Continued)

(56) References Cited

U.S. PATENT DOCUMENTS 5,387,928 A 2/1995 Nishimura
5,710,954 A * 1/1998 Inoue ................. H04N 5/23293
348/333.01

(Continued)

FOREIGN PATENT DOCUMENTS

JP 6-153157 A 5/1994
JP 2003-196638 A 7/2003
(Continued)

*Primary Examiner* — Jason A Flohre
(74) *Attorney, Agent, or Firm* — Jefferson IP Law, LLP

(57) ABSTRACT

A portable apparatus to provide a screen capturing function, when a display unit of the apparatus displays moving pictures on a display panel thereof, includes a button signal input unit to receive a button signal inputted by a user; a picture capturing unit to capture individual pictures of the moving pictures, when the inputted button signal is determined to be a first button signal; a thumbnail creating unit to create thumbnails of the captured pictures, the thumbnails being sequentially arranged on a predetermined portion of the display panel; and a screen recording button located on an exterior of the portable apparatus to generate the first button signal.

24 Claims, 7 Drawing Sheets

Related U.S. Application Data continuation of application No. 11/580,941, filed on Oct. 16, 2006, now abandoned.

(51) Int. Cl.
*H04N 21/422* (2011.01)
*H04N 21/431* (2011.01)
*H04N 21/433* (2011.01)
*H04N 21/845* (2011.01)
*H04N 21/47* (2011.01)
*H04N 5/232* (2006.01)
*H04N 5/44* (2011.01)
*H04N 5/45* (2011.01)
*H04N 9/82* (2006.01)

(52) U.S. Cl.
CPC ..... *H04N 5/232933* (2018.08); *H04N 5/2627* (2013.01); *H04N 5/4448* (2013.01); *H04N 5/45* (2013.01); *H04N 9/8227* (2013.01); *H04N 21/41407* (2013.01); *H04N 21/4221* (2013.01); *H04N 21/42215* (2013.01); *H04N 21/4316* (2013.01); *H04N 21/4334* (2013.01); *H04N 21/47* (2013.01); *H04N 21/8455* (2013.01); *H04N 5/232939* (2018.08)

(58) Field of Classification Search
CPC ........... H04N 21/4334; H04N 21/4316; H04N 21/42215; H04N 21/4221; H04N 21/41407; H04N 9/8227; H04N 5/45; H04N 5/4448; H04N 5/23293
See application file for complete search history.

(56) References Cited

U.S. PATENT DOCUMENTS

| | | | |
|---|---|---|---|
| 6,111,614 A | 8/2000 | Mugura et al. | |
| 6,396,520 B1 | 5/2002 | Ording | |
| 6,515,704 B1 | 2/2003 | Sato | |
| 6,871,010 B1 | 3/2005 | Taguchi et al. | |
| 7,009,658 B2 | 3/2006 | Kim | |
| 7,106,954 B2 | 9/2006 | Inoue et al. | |
| 7,145,601 B2 * | 12/2006 | Misawa | H04N 5/23293 348/333.05 |
| 7,148,906 B2 * | 12/2006 | Sakashita | G06F 3/14 348/333.05 |
| 7,251,790 B1 | 7/2007 | Drucker et al. | |
| 7,268,833 B2 * | 9/2007 | Park | H04N 5/44591 348/588 |
| 7,440,013 B2 | 10/2008 | Funakura | |
| 7,443,447 B2 | 10/2008 | Shirakawa | |
| 7,630,021 B2 | 12/2009 | Matsuzaka et al. | |
| 2001/0026678 A1 | 10/2001 | Nagasaka et al. | |
| 2002/0012522 A1 | 1/2002 | Kawakami et al. | |
| 2002/0018138 A1 * | 2/2002 | Yoshiro | H04N 5/232 348/333.05 |
| 2002/0067923 A1 | 6/2002 | Fujimura et al. | |
| 2002/0089505 A1 | 7/2002 | Ording | |
| 2003/0151676 A1 | 8/2003 | Seki et al. | |
| 2003/0160874 A1 | 8/2003 | Kuroiwa | |
| 2003/0164890 A1 | 9/2003 | Ejima et al. | |
| 2004/0036700 A1 | 2/2004 | Kashio | |
| 2004/0041934 A1 | 3/2004 | Shibutani | |
| 2004/0126089 A1 | 7/2004 | Suzuki | |
| 2004/0165085 A1 * | 8/2004 | Shibutani | H04N 5/232 348/231.3 |
| 2004/0189827 A1 | 9/2004 | Kim et al. | |
| 2004/0196503 A1 * | 10/2004 | Kurtenbach | H04N 1/00453 358/1.18 |
| 2004/0201764 A1 | 10/2004 | Honda et al. | |
| 2005/0134718 A1 | 6/2005 | Honda | |
| 2005/0231612 A1 | 10/2005 | Suzuki et al. | |
| 2005/0251758 A1 | 11/2005 | Cummins et al. | |
| 2006/0036568 A1 | 2/2006 | Moore et al. | |
| 2006/0087585 A1 | 4/2006 | Seo et al. | |
| 2006/0098111 A1 | 5/2006 | Goh et al. | |
| 2006/0114363 A1 | 6/2006 | Kang et al. | |
| 2006/0293077 A1 | 12/2006 | Aaltonen et al. | |

FOREIGN PATENT DOCUMENTS

| | | |
|---|---|---|
| JP | 2004-128884 A | 4/2004 |
| JP | 2005-115011 A | 4/2005 |
| KR | 10-2002-0007652 A | 1/2002 |
| KR | 10-2003-0059578 A | 7/2003 |
| KR | 10-2004-0000216 A | 1/2004 |
| KR | 10-2004-0080659 A | 9/2004 |

* cited by examiner

APPARATUS TO PROVIDE A SCREEN CAPTURING FUNCTION AND A METHOD OF PROVIDING THE SCREEN CAPTURING FUNCTION

CROSS-REFERENCE TO RELATED APPLICATION(S)

This application is a continuation application of prior application Ser. No. 14/674,551, filed on Mar. 31, 2015 and is a continuation application of prior application Ser. No. 11/580,941 filed on Oct. 16, 2006 which was based on and claimed priority under 35 U.S.C. § 119(a) of a Korean patent application number 10-2005-0100432, filed on Oct. 24, 2005, in the Korean Intellectual Property Office, the disclosure of which is incorporated by reference herein in its entirety.

BACKGROUND

1. Field

Aspects of the present invention relate to an apparatus to provide a screen capturing function and a method of providing the screen capturing function, and, more particularly, to an apparatus to provide a screen capturing function and a method of providing the screen capturing function, in which a moving picture reproduced on a display panel is captured and recorded using a screen recording button provided in a portable apparatus, and in which the captured image is displayed as a thumbnail.

2. Description of the Related Art

Recently, digital broadcasting services have quickly spread through existing media, such as ground wave broadcasting, satellite broadcasting, cable TV broadcasting, or the like, which has resulted in innovative changes in broadcasting industry environments. One type of medium, known as the DMB (Digital Multimedia Broadcasting) service, is a new medium that is represented by a cooperation of digital broadcasting and digital communications entities. One of the characteristics of the DMB service is that a user may watch multi-channel digital television broadcasting while on the move.

Before the DMB service is described, radio broadcasting, which is currently being used, will first be described. Radio broadcasting using an analog system was originally developed for fixed reception. Thus, if the user receives the radio broadcasting while walking or driving a vehicle, the sound quality of the radio broadcasting is significantly lowered, and higher output and a wider frequency band are required.

In order to solve theses problems, efforts have been made around the world to standardize to digital audio broadcasting and make it more suitable for practical use. As a result, DAB (Digital Audio Broadcasting) has been used in Europe, where Eureka-147 has been adopted as a DAB standard, DAR (Digital Audio Radio) has been used in the United States, DRB (Digital Radio Broadcasting) has been used in Canada, DSB (Digital Sound Broadcasting) has been used by the International Telecommunication Union (ITU-R), and DMB (Digital Multimedia Broadcasting) has been used in Korea.

DAB, having been developed for next generation broadcasting, is sufficiently robust to be compatible with electromagnetic wave environments and with noise in downtown areas. Therefore, even if transmissions are transmitted with low outputs, electric waves carrying sound with CD level quality can be received in a vehicle that is moving at high speed. Further, thanks to DAB, the concept of radio broadcasting is broadened from the existing 'listening' broadcasting to 'viewing and listening' broadcasting. As such, according to the DAB service, in addition to music broadcasting, a variety of multimedia information, such as news, traffic information, weather information, geographic and location information, moving picture information, and the like, can be transmitted through characters and graphics.

Meanwhile, DMB is a next generation broadcasting technique, in which sound broadcasting is digitized, with CD level sound quality which surpasses the level of existing AM and FM radio, and provides various data services, such as characters, graphics and moving pictures, at a data transmission speed of 1.5 Mbit/s, and further provides bidirectional services, superior quality broadcasting reception while a receiver is on the move, or the like.

The above-mentioned DMB is largely divided into ground wave DMB and satellite DMB based on a transmission medium, and the satellite DMB service is divided into a fixed service and a mobile service.

The structure of a DMB system incorporated into a cellular phone to implement reception while on the move according to the related art will be described.

The DMB system for reception while on the move mainly includes a mobile chipset that implements a cellular phone function, a DMB receiving chip that receives the DMB, and an LCD (liquid crystal display) that displays cellular phone pictures or DMB contents.

The mobile chipset controls the components of the cellular phone, performs various functions that are necessary for the operation of the cellular phone, and functions as a general processor. For example, the mobile chipset receives and processes the output of a camera, outputs pictures to the LCD of the cellular phone, and outputs ring tones of the cellular phone. In this case, the mobile chipset may be the only essential component of the cellular phone, and the DMB receiving chip may be additionally provided so as to add the DMB function to the cellular phone.

The DMB receiving chip is controlled by the mobile chipset, decodes the DMB signal, and outputs the decoded signal to the LCD to be displayed. A multiplexer is provided such that the output of the mobile chipset for the LCD and the output of the DMB receiving chip for the LCD are selectively displayed on the LCD.

The output of the mobile chipset to perform the existing cellular phone function and the DMB output are sources of pictures displayed on the LCD.

However, where a user wants to capture and record various kinds of pictures provided through a display panel of a portable apparatus (for example, a cellular phone or PDA) that has adopted the DMB service to provide a variety of multimedia information, since a separate hardware device needs to be provided, a system becomes complicated, and costs thereof increase.

Korean Patent Publication No. 2002-7652 discloses an apparatus to process a screen of a digital television and a method of processing the screen of a digital television. According to Korean Patent Publication No. 2002-7652, the method of processing a screen of a digital television includes displaying icons and supplementary information corresponding to picture data stored in a storage medium on a screen, selecting one of the displayed icons, and reproducing picture data corresponding to the selected icon. To this end, a technology is disclosed which displays icons corresponding to the picture data stored in the storage medium and reproduces picture data corresponding to selected icons. However, there is no technology in which predetermined pictures are captured and recorded according to a selection duration time during which a button is selected by a user and thumbnails of the predetermined pictures are displayed on the screen.

SUMMARY

An aspect of the present invention is to provide an apparatus providing a screen capturing function and a method of providing the screen capturing function, in which pictures reproduced on a display panel are captured by using a screen recording button provided in a portable apparatus, and thumbnails of images of the captured pictures are created so as to be supplied to one side of the display panel.

Another aspect of the present invention is to provide an apparatus providing a screen capturing function and a method of providing the screen capturing function, in which moving pictures reproduced on a display panel are recorded by using a screen recording button provided in a portable apparatus, and predetermined icons of the recorded moving pictures are supplied to one side of a display panel.

According to a first aspect of the present invention, a portable apparatus to provide a screen capturing function, when a display unit of the apparatus displays moving pictures on a display panel thereof, comprises a button signal input unit to receive a button signal inputted by a user; a picture capturing unit to capture individual pictures of the moving pictures, when the inputted button signal is determined to be a first button signal; a thumbnail creating unit to create thumbnails of the captured pictures, the thumbnails being sequentially arranged on a predetermined portion of the display panel; and a screen recording button located on an exterior of the portable apparatus to generate the first button signal.

According to a second aspect of the present invention, a portable apparatus to providing a screen capturing function when moving pictures are displayed thereon, the portable apparatus comprises a display panel having a first region in which the moving pictures are displayed and a second region in which thumbnails are displayed; and an input unit to capture images of the moving pictures, the captured images being incorporated into the thumbnails.

According to a third aspect the present invention, a portable apparatus to provide a screen capturing function when moving pictures are displayed thereon, comprises a display panel having a first region in which the moving pictures are displayed and a second region in which icons are displayed; and an input unit to record the moving pictures, the icons being created when the moving pictures, to which each of the icons are respectively associated, are recorded.

According to a fourth aspect of the present invention, a method of providing a screen capturing function when moving pictures are displayed on a display panel of a portable apparatus, comprises receiving a first button signal inputted by a user; determining whether the inputted button signal is a first button signal, and capturing displayed pictures when the input button signal is a first button signal; creating thumbnails of images of the captured pictures; and sequentially arranging the created thumbnails on a side of the display panel.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
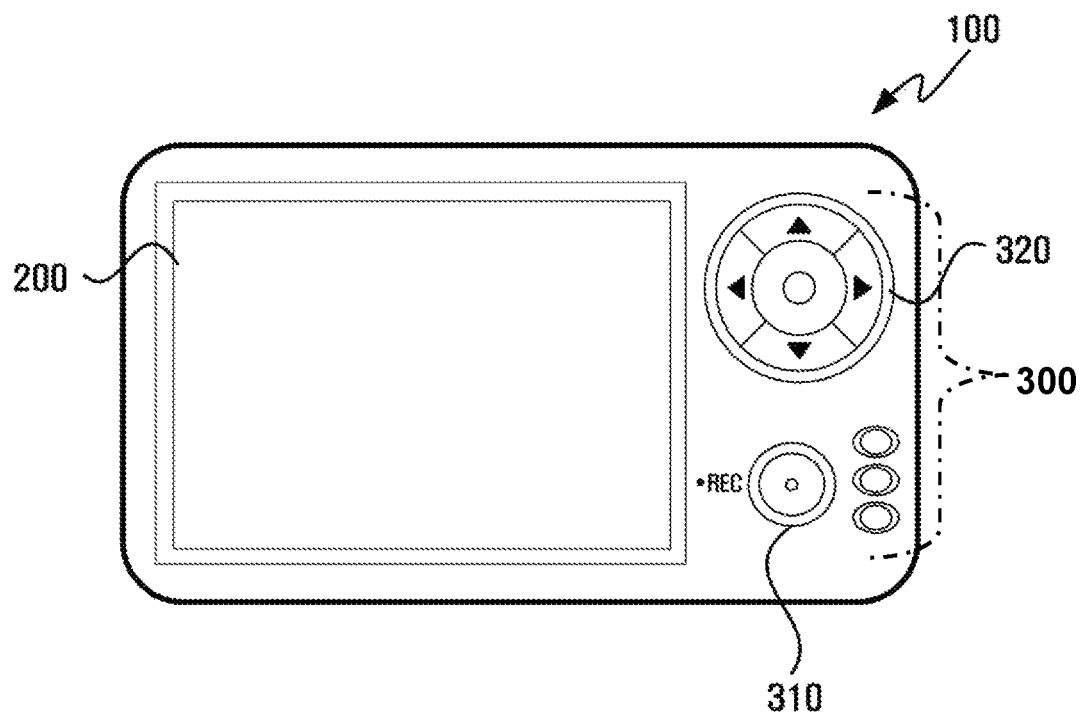
FIG. 1 is a diagram illustrating an apparatus for providing a screen capturing function according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The apparatus for and the method of providing a screen capturing function according to aspects of the present invention will now be described more fully with reference to the accompanying drawings, in which preferred embodiments of the present invention are shown. It is to be understood that blocks in the accompanying block diagrams and compositions of operations in flow charts can be performed by computer program instructions. These computer program instructions can be provided to processors of, for example, general-purpose computers, special-purpose computers, and programmable data processing apparatuses. Therefore, the instructions performed by the computer or the processors of the programmable data processing apparatus generate means for executing functions described in the blocks in block diagrams or the operations in the flow charts. The computer program instructions can be stored in a computer available memory or a computer readable memory of the computer or the programmable data processing apparatus in order to realize the functions in a specific manner. Therefore, the instructions stored in the computer available memory or the computer readable memory can manufacture products including the instruction means for performing the functions described in the blocks in the block diagrams or the operations in the flow charts. Also, the computer program instructions can be loaded onto the computer or the computer programmable data processing apparatus. Therefore, a series of operations is performed in the computer or the programmable data processing apparatus to generate a process executed by the computer, which makes it possible for the instructions driving the computer or the programmable data processing apparatus to provide operations of executing the functions described in the blocks of the block diagrams or the operations of the flow charts.

Each block or operation may indicate a portion of a module, a segment or a code including one or more executable instructions to perform a specific logical function (or functions). It should be noted that, in some modifications of the present invention, the functions described in the blocks or the operations may be generated out of order. For example, two blocks or operations that are continuously shown can be actually performed at the same time, or they can sometimes be performed in reverse order according to the corresponding functions.

FIG. 1 is a diagram illustrating a portable apparatus to provide a screen capturing function according to an embodiment of the present invention. As shown in FIG. 1, a portable apparatus 100 includes a display panel 200 and a plurality of input units 300. In this case, the portable apparatus 100 is carried by a user and provides moving pictures and a variety of information to the user. Examples of the portable apparatus 100 may include cellular phones, PDAs (personal digital assistants), and PMPs (portable multimedia players).

The display panel 200 displays predetermined moving pictures and a variety of information that are transmitted to the portable apparatus 100 by a broadcasting station.

According to embodiments of the invention, the display panel 200 may be divided into first and second regions, in which the first region displays predetermined moving pictures transmitted by the broadcasting station, and the second region displays thumbnails for captured images of the displayed moving pictures or icons created when the displayed moving pictures are recorded.

In addition, when the plurality of thumbnails and icons are displayed on the second region of the display panel 200, they may be sequentially displayed.

If the user selects the thumbnails (or icons) displayed on the second region of the display panel 200, pictures (or moving pictures) corresponding to the selected thumbnails are displayed (or reproduced) on the first region and the second region (that is, the entire screen) of the display panel 200.

Accordingly, the user may immediately confirm the images captured through the thumbnails that are displayed on the second region of the display panel 200 so as to quickly recognize the number of the captured (or recorded) pictures.

The input units 300 include a screen recording button 310, four directional buttons 320 that control movement of a cursor or mouse in four directions, and a plurality of buttons 330, each of which has an assigned specific function.

The screen recording button 310 is used to capture or record moving pictures that are reproduced on the display panel 200, and generates a first button signal or a second button signal according to a duration time by the user. For example, if the user pushes the screen recording button 310 for a short time, the screen recording button 310 generates the first button signal to capture a corresponding image, and if the user pushes down the screen recording button 310 for a long time, the screen recording button 310 generates the second button signal to record a corresponding moving picture.

Further, if the user pushes down the screen recording button 310 for a long time, the screen recording button 310 generates the second signal to record the corresponding moving picture, as described above. Then, if the user pushes down the screen recording button 310 again for a short time, the screen recording button 310 generates a signal to stop the recording of the moving picture in progress.

Meanwhile, if the user pushes down the screen recording button 310, whether for a short time or a long time, a predetermined sound effect is outputted. For example, if the user pushes down the screen recording button 310 for a short time such that a capture function is performed, a camera shutter sound is outputted, and if the user pushes down the screen recording button 310 for a long time such that a recording function is performed, a click is outputted.

Figure 2:
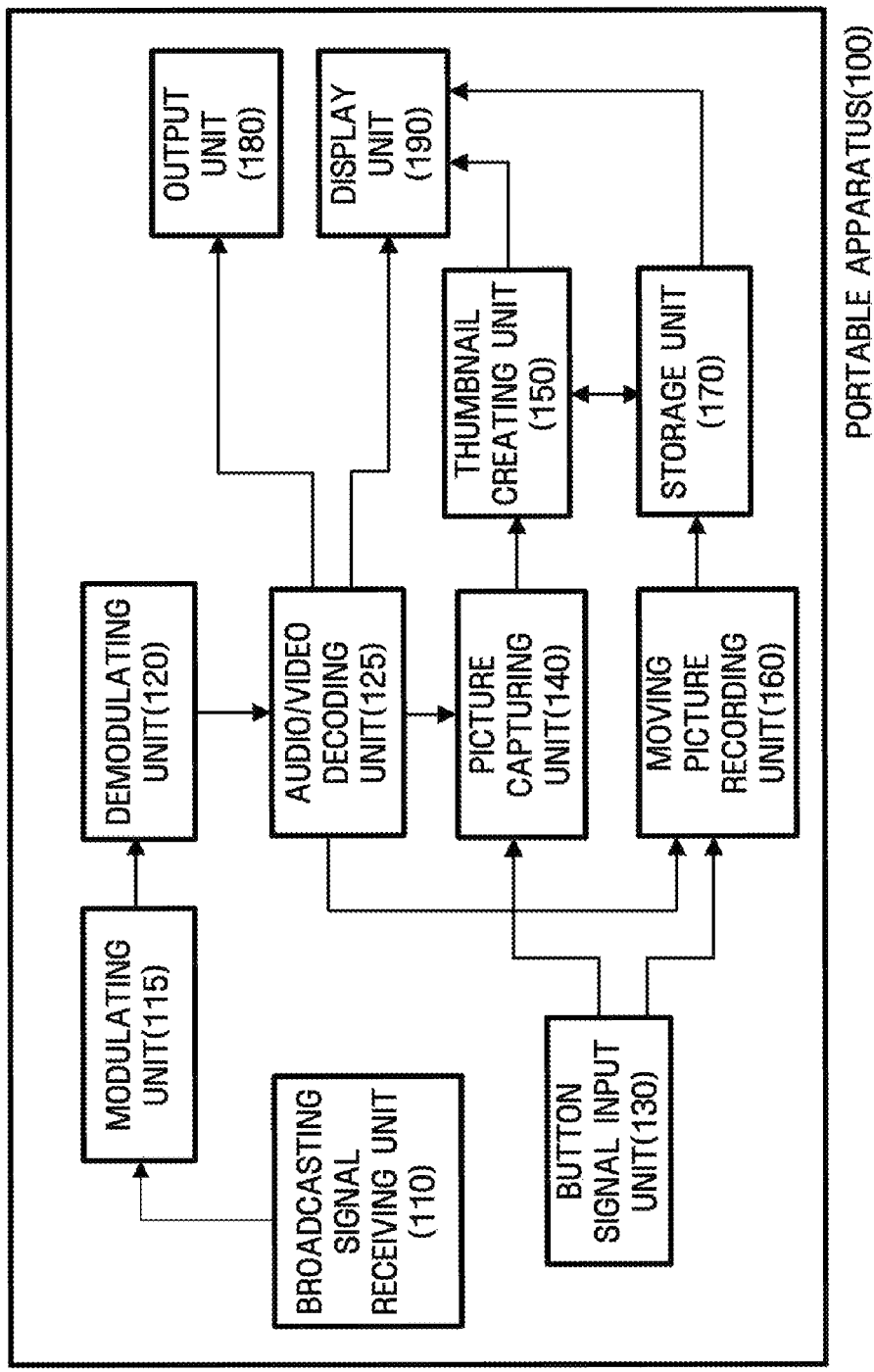
FIG. 2 is a block diagram illustrating an inner structure of an apparatus for providing a screen capturing function according to the embodiment of FIG. 1.

FIG. 2 is a block diagram illustrating an inner structure of a portable apparatus to provide a screen capturing function according to the present invention. As shown in FIG. 2, the portable apparatus 100 includes a broadcasting signal receiving unit 110, a demodulating unit 115, a demultiplexing unit 120, an audio/video decoding unit 125, a button signal input unit 130, a picture capturing unit 140, a thumbnail creating unit 150, a moving picture recording unit 160, a storage unit 170, an output unit 180, and a display unit 190.

At this time, each of the respective components in the embodiments, refers to, but is not limited to, a software or hardware component, such as a Field Programmable Gate Array (FPGA) or Application Specific Integrated Circuit (ASIC). A module may be advantageously configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a security multimedia card.

The broadcasting signal receiving unit 110 receives broadcasting signals (e.g., video data, audio data, and information data) that are transmitted by a satellite DMB broadcasting station or by a ground-wave DMB broadcasting station. The demodulating unit 115 demodulates the broadcasting signal that is received by the broadcasting signal receiving unit 110, and the demultiplexing unit 120 restores the broadcasting signal that is demodulated by the demodulating unit 115. The audio/video decoding unit 125 decodes the broadcasting signals by an MPEG (Moving Picture Expert Group phase) system.

The button signal input unit 130 receives the button signal generated by the user and determines whether the button signal, which is generated based on the duration of time during which the screen recording button 310 is selected by the user, is a first button signal or a second button signal. As a result of the determination, if the selection duration time of the screen recording button 310 is short, the button signal input unit 130 confirms the inputted button signal as the first button signal, and if the selection duration time of the screen recording button 310 is long, the button signal input unit 130 confirms the inputted button signal as the second button signal. According to an embodiment of the invention, if the inputted button signal is the first button signal, the picture provided to the display panel 200 is captured, and if the inputted button signal is the second button signal, the moving picture provided to the display panel 200 is recorded, although, of course, the invention is not limited to this arrangement.

In addition, according to another embodiment, after the second button signal is inputted, if the button signal is inputted with the selection duration time being short, the button signal input unit 130 confirms the corresponding button signal as a signal to request that the recording of the moving picture is stopped.

If the button signal inputted according to the determination result of the button signal input unit 130 is the first button signal, the picture capturing unit 140 captures the picture provided to the display panel 200.

For example, where a desired picture is displayed on the display unit while the user watches a predetermined moving picture through the portable apparatus 100, if the user pushes down the screen recording button 310 provided in the portable apparatus 100 for a short time, the picture of the displayed screen is captured right after the screen recording button 310 is selected.

The thumbnail creating unit 150 creates a thumbnail corresponding to the image of the picture captured through the picture capturing unit 140.

For example, the thumbnail creating unit 150 creates a thumbnail corresponding to the image of the captured predetermined picture. Thus, the user may confirm that the thumbnail is created to immediately confirm that the image is captured.

If the inputted button signal is confirmed as the second button signal, the moving picture recording unit 160 records the moving picture supplied to the display panel 200. Further, if the input signal of the screen recording button 310 is inputted through the button signal input unit 130 during the recording of the predetermined moving picture, the moving picture recording unit 160 stops the recording operation in progress.

After the moving picture recording unit 160 records the predetermined moving picture, the moving picture recording unit 160 creates an icon indicating that the predetermined moving picture has been recorded. Instead of creating the icon, the thumbnail creating unit 150 then creates a thumbnail corresponding to a predetermined picture among the recorded moving pictures.

The storage unit 170 stores the pictures captured through the picture capturing unit 140 and the moving pictures recorded through the moving picture recording unit 160. The storage unit 170 also stores the thumbnails created by the thumbnail creating unit 150.

When the moving picture is displayed on the display panel 200, the output unit 180 outputs audio data that is interlocked with the video data that is being reproduced, and, if the user selects the screen recording button 310, the output unit 180 outputs prescribed sound effects. In this case, the outputted sound effects may be set by the user.

The display unit 190 displays the predetermined moving pictures and a variety of information transmitted by the broadcasting station, and displays the captured pictures and the recorded moving pictures stored in the storage unit 170. When the captured images and the moving pictures stored in the storage unit are displayed and reproduced by the user, they are displayed on an entire screen of the display panel 200.

Further, the display unit 190 sequentially arranges the thumbnails created by the thumbnail creating unit 150 on one side of the display panel 200 to display them, and sequentially arranges the icons created when the moving picture is recorded on the other side of the display panel 200 to display them.

Figure 3A:
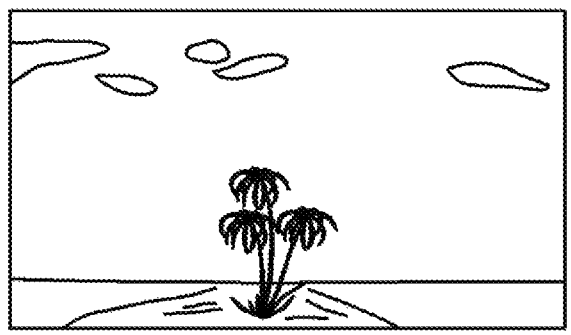
FIGS. 3A to 3E are diagrams illustrating a process of capturing pictures that are displayed on a display panel of a portable apparatus for providing a screen capturing function according the embodiment of FIG. 1.
Figure 3B:
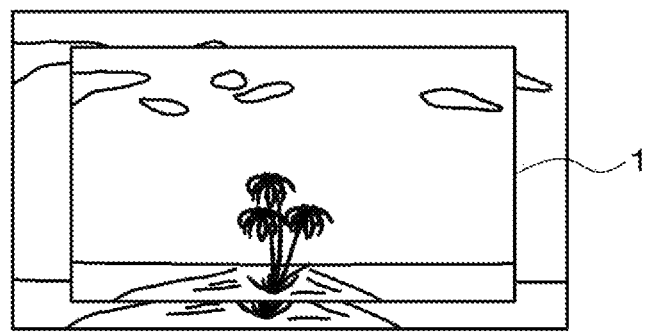
Figure 3C:
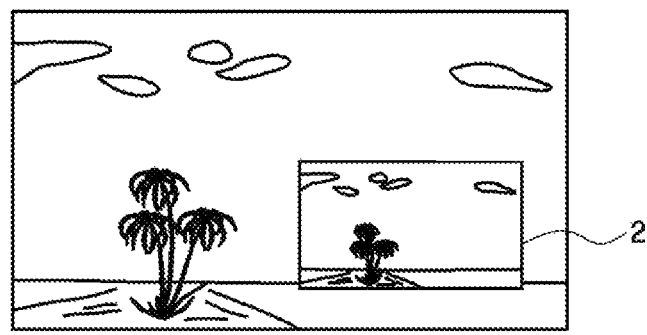
Figure 3D:
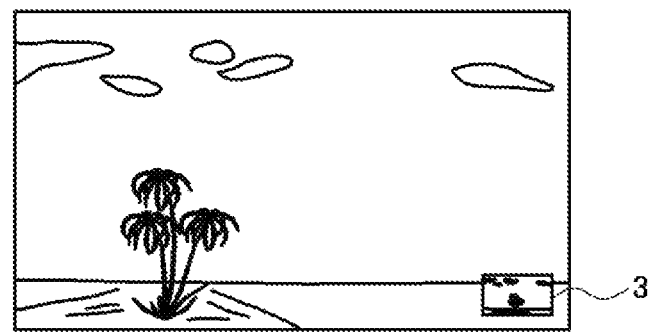
Figure 3E:
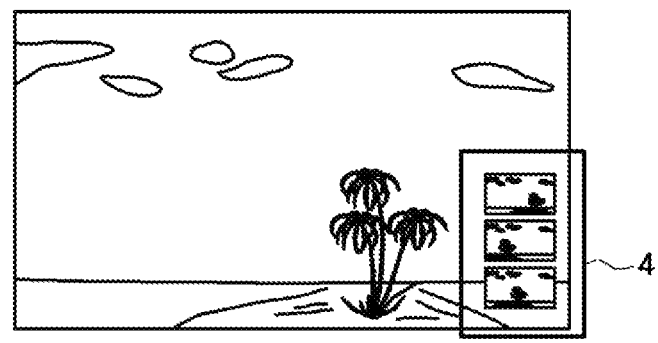

FIGS. 3A to 3E are diagrams illustrating a process of capturing the pictures that are displayed on the display panel of the portable apparatus for providing the screen capturing function according to another embodiment of the present invention. As shown in FIG. 3A, where the predetermined moving picture is displayed on the display panel 200 and the user wants to capture the currently displayed pictures, the user pushes down the screen recording button 310 for a short time. Then, as shown in FIG. 3B, the screen of the corresponding picture is supplied as a still screen 1 for a short time. The screen of the captured picture becomes a reduced screen 2 and is then displayed, as shown in FIG. 3C. As shown in FIG. 3D, the captured picture is then supplied to a second region of the display panel (that is, the lower right region) as a thumbnail 3. Meanwhile, if the user captures a plurality of pictures among the moving pictures reproduced on the display panel 200, a plurality of thumbnails are sequentially arranged on a new second region of the display panel (that is, the right region) (screen 4) and then displayed, as shown in FIG. 3E.

Accordingly, the user may immediately confirm the captured images through displayed thumbnails, and may understand the number of captured images at a glance. Further, if the user selects the screen recording button 310 to capture the predetermined picture, since the camera shutter sounds are outputted, the user knows a state of the capturing work through outputted sound effects.

Figure 4A:
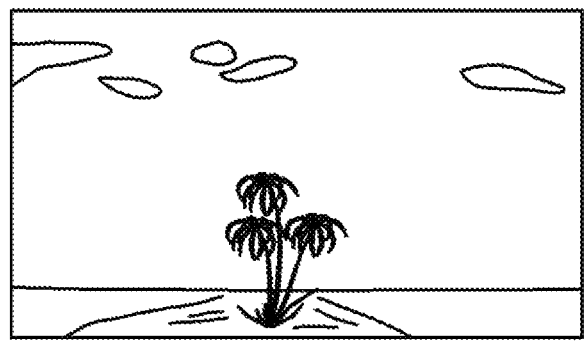
FIGS. 4A to 4D are diagrams illustrating a process of recording moving pictures that are displayed on a display panel of a portable apparatus for providing a screen capturing function according the embodiment of FIG. 1.
Figure 4B:
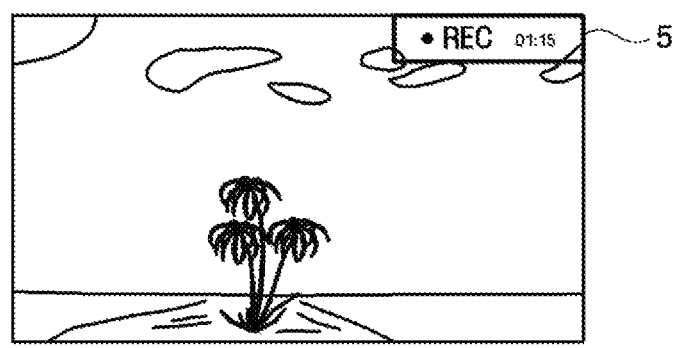
Figure 4C:
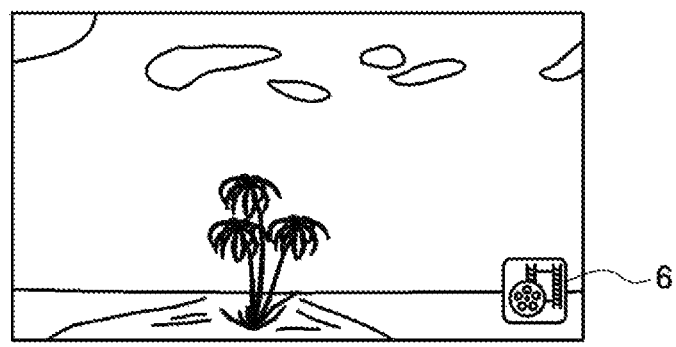
Figure 4D:
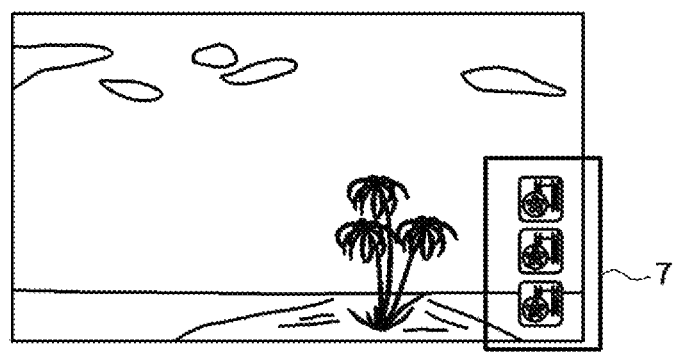

FIGS. 4A to 4D illustrate a process of recording a moving picture displayed on the display panel of the portable apparatus providing a screen capturing function according to another embodiment of the present invention. As shown in FIG. 4A, where the predetermined moving picture is displayed on the display panel 200 and the user wants to record the currently displayed moving picture, the user pushes down the screen recording button 310 for a long time. Then, as shown in FIG. 4B, information indicating that recording of the moving picture, which is currently being reproduced, is in progress, and a time recording how long the corresponding moving picture has been recorded are displayed on the upper right side of the display panel 200 (screen 5). Then, if the user pushes down the screen recording button 310 again to stop the recording of the corresponding moving picture, the recording operation in progress is stopped, and a predetermined icon 6 indicating that the moving picture is recorded is provided to the second region of the display panel (that is, the lower right region), as shown in FIG. 4C. In this case, instead of providing the icon, the thumbnail creating unit may provide a thumbnail from the recorded moving picture. Meanwhile, where the user records a plurality of moving pictures among the moving pictures reproduced on the display panel 200, a plurality of icons are sequentially arranged on the right region of the display panel and then displayed (screen 7), as shown in FIG. 4D.

According to another embodiment of the invention, the icons shown in FIG. 4D may be distinguished from one another to identify the recorded moving picture to the user. An example of a distinguishing characteristic may a number that is added to each icon to indicate the order in which they were created and to thereby indicate an order the corresponding recorded moving pictures appear in the original moving picture.

Accordingly, the user may conveniently record an interval of the desired moving picture when watching the moving pictures, and may know the number of the recorded moving pictures at a glance through the icons displayed on one side of the display panel.

Figure 5:
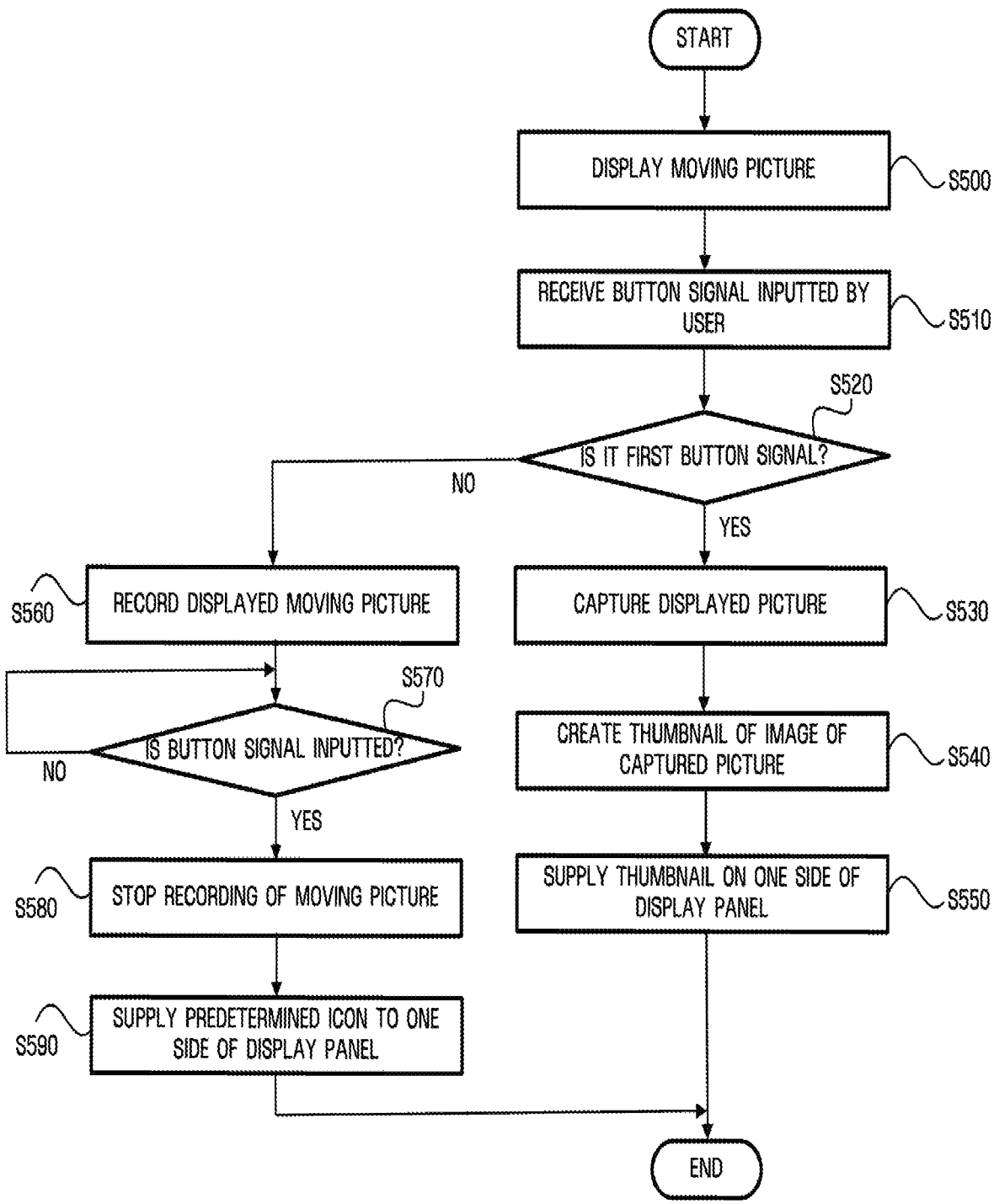
FIG. 5 is a flow chart illustrating a method of providing a screen capturing function according the embodiment of FIG. 1.

FIG. 5 is a flowchart illustrating a method of providing a screen capturing function according to another embodiment of the present invention. First, if the signals transmitted by the DMB broadcasting station are received, the received broadcasting signals are decoded and then displayed on the display panel 200 of the portable apparatus 100 (S500), and the user selects the screen recording button 310 to capture a moving picture that is displayed on the display panel 200 and that is being reproduced.

Then, the button signal input unit 130 receives the button signal (an initial button signal) generated by the user (S510), and determines whether the inputted signal is a first signal or a second signal. In this case, the determination is based on the selection duration time during which the screen recording button 310 is selected by the user. For example, if the selection duration time of the screen recording button 310 is found to be short, the button signal input unit 130 determines the inputted button signal as being the first button signal, and if the selection duration time of the screen recording button 310 is found to be long, the button signal input unit 130 determines the inputted button signal as being the second button signal. At this time, if the inputted signal is the first button signal, pictures are captured, and if the inputted signal is the second button signal, moving pictures are recorded.

As a result of the determination, if the signal inputted by the user is determined to be the first button signal (S520), the picture capturing unit 140 captures the pictures of the displayed screen right (S530) right after the user selects the screen recording button 310. Then, the thumbnail creating unit 150 creates the images of the captured pictures as thumbnails (S540), and the created thumbnails are displayed on the second region of the display panel 200 through the display unit 190 (S550).

Meanwhile, if the signal inputted by the user is determined to be the second button signal (S520), the moving picture recording unit 160 records the moving picture provided to the display panel 200 (S560). Then, the button signal input unit 130 checks whether the button signal (a secondary button signal) is generated by the user (S570). At this time, if the button signal is found to be generated by the user, the moving picture recording unit 160 stops the moving picture recording operation in progress (S580). In this case, when the user wants to stop the moving picture recording operation in progress, the user pushes down the screen recording button 310 for a short time.

Then, if the recording of the moving picture is stopped, the moving picture recording unit 160 creates a predetermined type of icon, and the created icon is displayed on the second region of the display panel 200 through the display unit 190 (S590). Here, instead of creating the icon, the thumbnail creating unit 150 may provide a predetermined thumbnail.

Meanwhile, if the user selects the thumbnails or the icons that are displayed on the second region of the display panel 200, the picture images and the recorded moving pictures, which have been captured in the first region (that is, entire screen), are displayed on the display panel 200.

Accordingly, the user may conveniently capture (or record) a picture that the user wants to capture or (record) when watching the predetermined moving picture by using the portable apparatus 100. Further, the thumbnails for the captured (or recorded) pictures are provided to the screen, so that the user can know the captured pictures and the number of the captured pictures.

The portable apparatus for providing a screen capturing function and the method of providing the screen capturing function, according to aspects of the present invention, achieves the following effects.

The pictures that are being reproduced on the display panel may be captured by using the screen recording buttons provided in the portable apparatus, the images of the captured pictures may be created as thumbnails to be provided to one side of the display panel, and the user may immediately recognize the captured pictures and know the number of the captured pictures.

The moving pictures that are being reproduced on the display panel may be recorded by using the screen recording buttons provided in the portable apparatus, predetermined icons for the recorded moving pictures may be provided to one side of the display panel, and, thus, the user may immediately know the number of recorded moving pictures.

The displayed moving picture may be captured by the screen recording buttons without a separate device, and, thus, the desired picture may be conveniently captured. Therefore, a separate device to capture the predetermined picture is not required.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A portable apparatus to provide a capturing function, the apparatus comprising:
   a display panel for displaying moving images in a first region; and
   a processor configured to:
      capture a picture corresponding to the moving images in response to a capturing signal which is generated by a button which is operated by a user,
      in response to the capturing signal, display a thumbnail image corresponding to the captured picture in a second region, and
      in response to a record signal which differs in length from the capturing signal and a second capturing signal to capture a second image:
         store a recorded clip of the moving images, and
         display a corresponding icon to the recorded clip in a third region which is displayed on an opposite side of the display panel from the second region,
   wherein the thumbnail image corresponding to the captured picture is displayed in the second region by applying a visual effect such that the thumbnail image is gradually reduced in size to be displayed in a next thumbnail of an equally sized sequence of thumbnail images in the second region upon the capturing of the corresponding picture while the moving images are displayed in the first region,
   wherein, after the capturing of the picture, the moving images are displayed in the first region together with the thumbnail image displayed in the second region, and
   wherein the thumbnail image which is gradually reduced in size comprises a still image which has been captured before a current frame of the moving images is displayed.

2. The apparatus according to claim 1,
   wherein the processor is further configured to record the moving images being displayed in the first region in response to the record signal,
   wherein the record signal is generated when the button is pressed more than a predetermined time, and
   wherein the capturing signal is generated when displaying the moving images and the button is pressed less than the predetermined time by the user.

3. The apparatus according to claim 2, wherein, when a clip of the moving images is recorded by the processor, a visual effect is applied such that a thumbnail image corresponding to the recorded clip is gradually displayed in the second region upon recording of the clip.

4. The apparatus of claim 2, wherein the display panel displays information corresponding to the recording of the moving images.

5. The apparatus according to claim 1, wherein the icon corresponding to the recorded clip is a thumbnail of a picture from among the recorded moving images of the clip.

6. The apparatus according to claim 1,
wherein, when the icon is selected, the recorded clip corresponding to the selected icon is reproduced on the display panel.

7. The apparatus according to claim 1, wherein the clip of the moving images is recorded by the processor, and a recording time is displayed in the first region.

8. The apparatus according to claim 1, wherein the second region is overwrapped on the first region.

9. The apparatus according to claim 1, wherein, when a thumbnail is selected from the second region, a picture corresponding to the thumbnail is displayed in the first region and the second region.

10. The apparatus according to claim 1, wherein the moving images are from a broadcasting signal.

11. The apparatus according to claim 1, wherein the moving images are from a camera unit.

12. The apparatus according to claim 1, wherein a portion of a plurality of the thumbnail images corresponding to a sequence of captured pictures are sequentially arranged on the second region.

13. A portable apparatus to provide a capturing function, the apparatus comprising:
a display panel; and
a processor configured to:
control the display panel to display moving images in a first region,
capture a first picture in response to a first capturing signal generated based on a button input while the moving images are displayed in the first region,
in response to the first capturing signal, display a first thumbnail image corresponding to the first picture in a second region, wherein, after the capturing of the first picture, the moving images are displayed in the first region together with the first thumbnail image displayed in the second region,
capture a second picture corresponding to the moving images displayed in the first region in response to a second capturing signal generated based on a button input after the capturing of the first picture,
in response to the second capturing signal, display a second thumbnail image corresponding to the second picture in the second region while the moving images are displayed in the first region, and
in response to a record signal which differs in length from the first capturing signal and the second capturing signal, store a recorded clip of the moving images and display a corresponding icon to the recorded clip in a third region which is displayed on an opposite side of the display panel from the second region.

14. The apparatus according to claim 13,
wherein the processor is further configured to record the moving images being displayed in the first region in response to the record signal,
wherein the record signal is generated when display the moving images and the button input is pressed more than a predetermined time, and
wherein the first and the second capturing signal is generated when display the moving images and the button input is pressed less than the predetermined time by a user.

15. The apparatus according to claim 14 wherein, when a clip of the moving images is recorded by the processor, a visual effect is applied such that a thumbnail image corresponding to the recorded clip is gradually displayed in the second region upon recording of the clip.

16. The apparatus of claim 14, wherein the display panel displays information corresponding to the recording of moving images.

17. The apparatus according to claim 13, wherein the icon corresponding to the recorded clip is a thumbnail of a picture from among the recorded moving images of the clip.

18. The apparatus according to claim 13,
wherein, when the icon is selected, the recorded clip corresponding to the selected icon is reproduced on the display panel.

19. The apparatus according to claim 13, wherein the clip of the moving images is recorded by the processor, and a recording time is displayed in the first region.

20. The apparatus according to claim 13, wherein the second region is overwrapped on the first region.

21. The apparatus according to claim 13, wherein, when a thumbnail is selected from the second region, a picture corresponding to the thumbnail is displayed in the first region and the second region.

22. The apparatus according to claim 13, wherein the moving images are from a broadcasting signal.

23. The apparatus according to claim 13, wherein the moving images are from a camera unit.

24. The apparatus according to claim 13, wherein the second thumbnail image is displayed above the first thumbnail image in the second region.

* * * * *